(No Model.) 2 Sheets—Sheet 1.

A. BONNA.
PISTON METER.

No. 366,370. Patented July 12, 1887.

Witnesses:

Inventor:
Aimé Bonna
By his attorneys
Brown & Hall (No Model.) 2 Sheets—Sheet 2.

A. BONNA.
PISTON METER.

No. 366,370. Patented July 12, 1887.

Witnesses: C. Sundgren, Emil Herter.

Inventor: Aimé Bonna
by his attorneys Brown & Hall

UNITED STATES PATENT OFFICE.

AIMÉ BONNA, OF PARIS, FRANCE.

PISTON-METER.

SPECIFICATION forming part of Letters Patent No. 366,370, dated July 12, 1887.

Application filed August 8, 1884. Serial No. 140,057. (No model.)

*To all whom it may concern:*

Be it known that I, AIMÉ BONNA, a citizen of the Republic of France, and a resident of the city of Paris, in the Republic of France, have invented a new and useful Improvement in Fluid-Meters, of which the following is a specification, reference being had to the accompanying drawings.

The object of this invention is to provide a meter of simple construction for water, gas, and other fluids, which, while adapted to the measurement and registration of large deliveries, will also measure and register accurately the smallest delivery.

The invention consists in the combinations of cylinders, pistons, crank-shaft, turbine, valves, gearing, and registering devices, hereinafter described and claimed.

Figure 1:
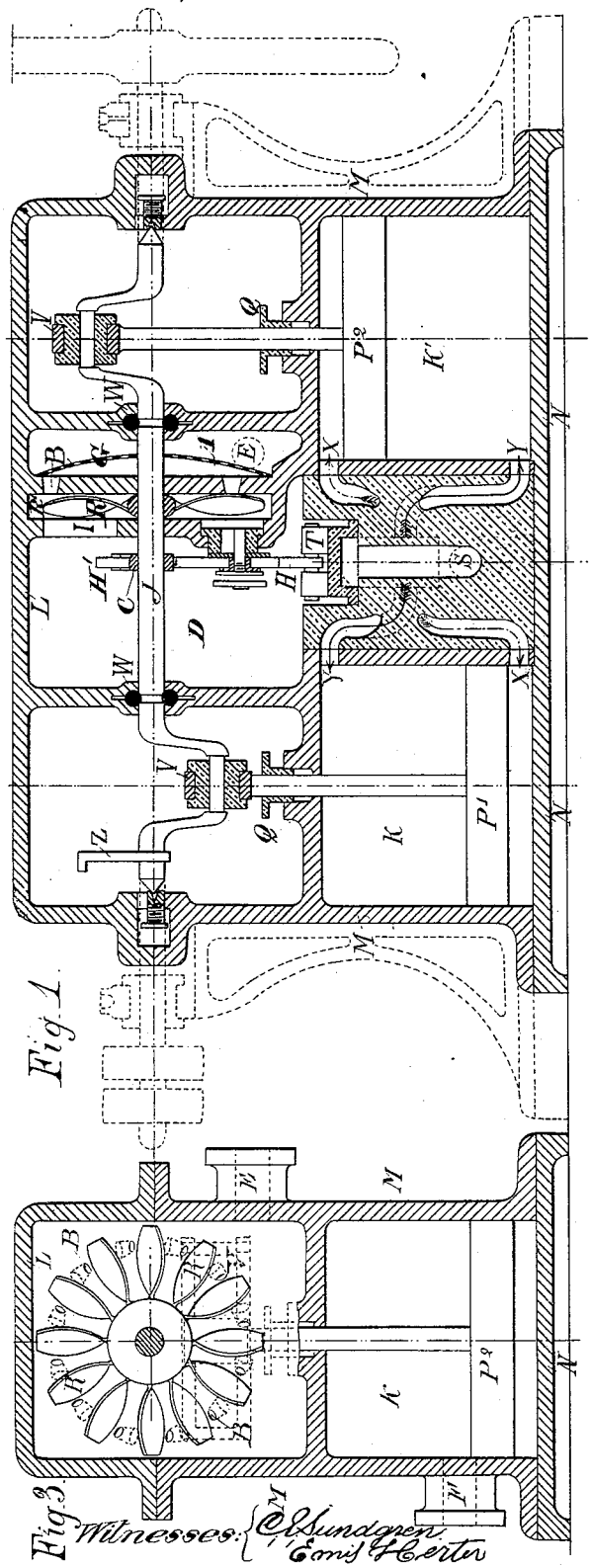
Figure 3:
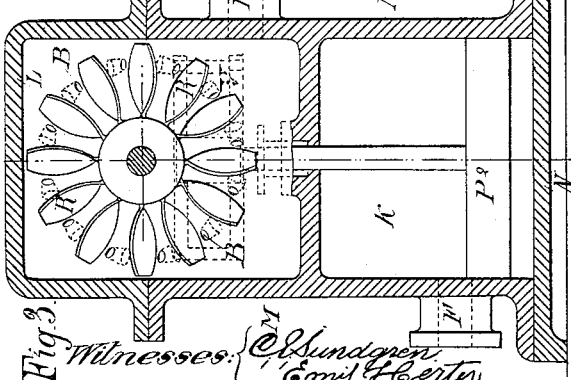
Figure 2:
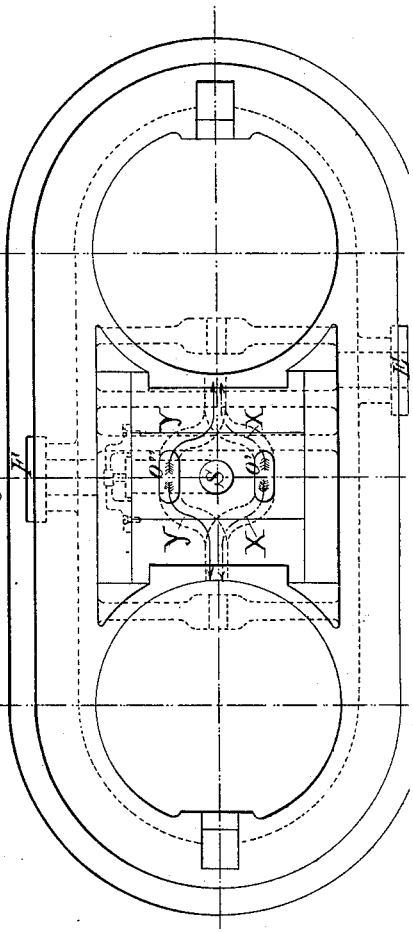
Figure 4:
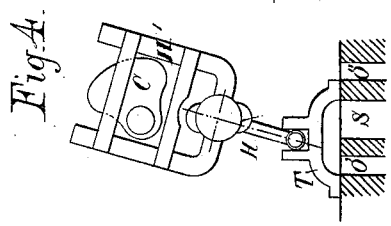
Figure 9:
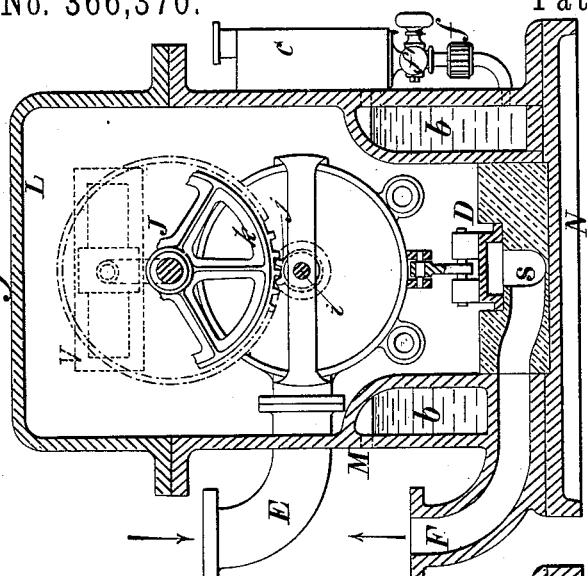
Figure 8:
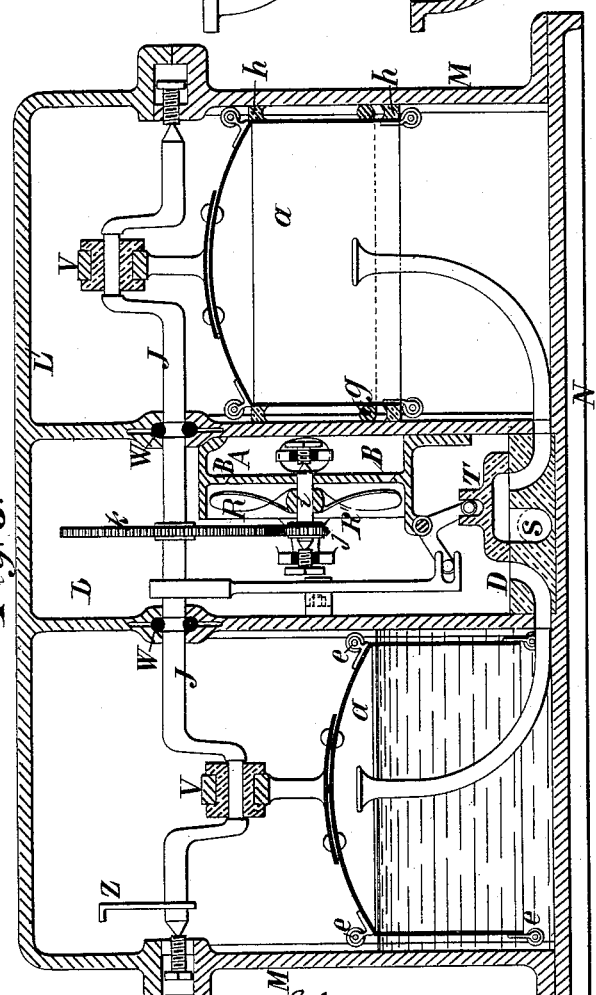
Figure 7:
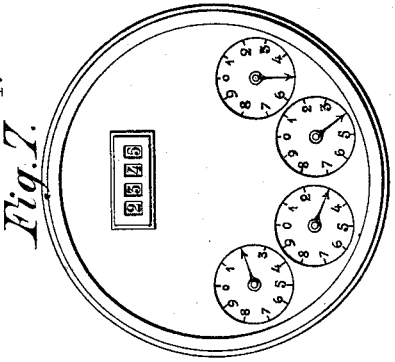
Figure 6:
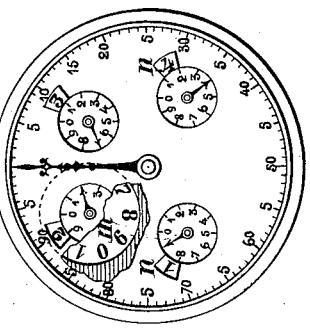
Figure 5:
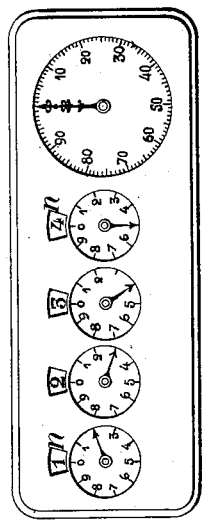

Figure 1 represents a longitudinal vertical section of a water-meter constructed according to my invention. Fig. 2 is a plan view of the same. Fig. 3 is a vertical transverse sectional view of the same. Fig. 4 is a detail view of the slide-valve and its operating mechanism. Figs. 5, 6, and 7 are face views of various forms of dial which may be employed in the meter for registering. Fig. 8 is a longitudinal vertical sectional view of a gas-meter, illustrating a modification of my invention. Fig. 9 is a transverse vertical section corresponding with Fig. 8.

Similar letters of reference designate corresponding parts in all the figures.

I will now describe the liquid-meter illustrated by Figs. 1, 2, and 3. In this meter the mechanism is completely inclosed within a cast-iron casing, M, provided with two tube-connections, of which the one, E, is for the entrance of the liquid, and the other, F, for its exit. This casing M is closed at its base by a flanged bottom, N, and at the top by a cover, L.

The interior of the apparatus consists of the following essential parts: First, of one or more helicoidal wheels, R, resembling turbines, and constituting the first motor, which is acted upon by the impact of the entering liquid, and cylinders K K', serving as second motors, and in which move the measuring-pistons P' P², which are connected by slotted cross-heads V, with two cranks on the shaft J, on which is fast the wheel R, the said shaft working in bearings in the ends of the casing M; second, of the shaft J, carrying the cam C, which operates the slide-valve T, through the intermediation of a yoke-lever, H H'; third, of a special distribution-chamber, D, which is put in communication with the two cylinders K K' by means of the slide-valve T.

The water enters through the tube-connection E into the chamber A, where it meets the strainer G, upon which it deposits any solid matters in suspension. It afterward enters into the chamber R', containing the wheel R, by means of small ducts B, inclined in the direction of rotation of the wheel. The water, having acted by impact upon the wheel R, passes out from the chamber R', through an opening or openings I, and fills the distribution-chamber D, whence it passes by the valve T to the measuring-cylinders K K', operating upon the pistons P' P², and giving them a reciprocating rectilinear motion, through which rotary motion is given to the shaft J, the liquid passing out by the exit-tube F. This rotary motion is assisted by the action of the water on the helicoidal wheel R.

The seat of the valve T contains three orifices, of which two, O' O'', serve to put the cylinders in communication with the distribution-chamber D, and the third, S, arranged between the other two, constitutes the orifice of the emission communicating with the pipe-connection F.

The distribution-chamber D, the arrangement of which requires the employment of but one valve, is peculiar to my apparatus. In this arrangement the passage of communication corresponding to the port O' is bifurcated into two secondary passages, X X, of which one communicates with the cylinder K at the bottom and the other with the cylinder K' at the top. Reciprocally the passage corresponding to the port O'' is bifurcated into two secondary passages, Y Y, of which one enters the cylinder K at the top and the other enters the cylinder K' at the bottom.

In the position represented in Fig. 4 the valve covers the ports O' and S and leaves uncovered the port O''. The upper face of the piston P' and the lower face of the piston P² are thus by means of the passages Y Y in communication with the eduction-tube connection F.

Water being allowed to flow out, the pistons will be set in motion and the quantity of water equal to the displacement produced in the cylinders by the stroke of the pistons P' P² will be expelled through the tube-connection F. At the moment when the pistons reach the end of their stroke the cam C quickly displaces the valve by means of the yoke-lever H and uncovers the port O' and covers the orifice O'', which will be put in communication with the eduction-port S. The equilibrium being destroyed, the pressure acts upon the lower face of the piston P' and upper face of the piston P². The pistons will then move in the opposite direction to that first described and deliver a new and equal quantity of water. The rods of the pistons P' P² pass through the upper cylinder-head through stuffing-boxes Q and produce the rotation of the cranks of the shaft J by means of the slotted cross-heads V and a sliding crank-wrist box working therein.

The rotary shaft J may give motion to the dial-work for registering the passage of liquid through any suitable mechanism, such as is commonly employed in meters actuated by a tappet, Z, on the said shaft. The dial-work may be of any of the well-known kinds—such, for instance, as those represented in Figs. 5, 6, and 7.

I will now describe the gas-meter illustrated in Figs. 8 and 9. The pistons of this meter consist of two inverted cups of sheet metal, a, the upper parts of which are of dome shape, and the lower parts of which enter a bath of water, glycerine, or other liquid, forming a hydraulic joint. In order to insure the verticality of their movement anti-friction rollers e are arranged on their upper and lower parts and roll freely against fixed guides within the casing M. The two cylinders in which these pistons move are connected by two lateral passages, b, (see Fig. 9,) which maintain the liquid within them at the same level. Moreover, in order to insure the constancy of this level I add to the apparatus a small reservoir, c, arranged outside of the casing, and from which the liquid may be introduced to the cylinders through a pipe, f, furnished with a stop-cock, f'.

The operation of this apparatus is as follows: The gas arrives by the inlet-tube connection E in the chamber A, whence it passes by the ducts B into the chamber R', containing the helicoidal wheel or turbine R, and after having acted by its impact upon this wheel passes out from the said chamber into the distributing-chamber D, whence it passes to the cylinders by the slide-valve T and operates upon the pistons to produce their rectilinear reciprocating motion in opposite directions alternately, and thereby produce the rotary motion of the shaft J, the gas afterward passing out by the outlet-tube connection F.

In order to insure the tightness of the pistons, I have represented the right-hand piston in Fig. 8 as surrounded with an elastic india-rubber ring, g, working freely between its exterior and the interior of the cylinder. The course of this ring is limited by metallic rings h h, fastened to the upper and lower parts of the cylinder.

It will be seen by reference to Figs. 8 and 9 that the helicoidal wheel or turbine R, instead of being fast upon the crank-shaft J, as in the meter first described, is fast upon a separate shaft, i, which is arranged in suitable bearings within the casing, and which is furnished with a toothed pinion, j, which gears with a toothed wheel, k, fast on the shaft J. The helicoidal wheel or turbine is thus made to transmit to the crank-shaft J the motive force which it derives from the impact of the water on its entrance into the meter.

What I claim as my invention, and desire to secure by Letters Patent, is—

The combination, in a meter, of two cylinders, two pistons working in said cylinders, a shaft having two cranks, connections between said pistons and said cranks, a valve and valve-gear operated by the crank-shaft for induction to and from said cylinders of the fluid to be measured, a turbine attached to or geared with said shaft, ducts through which the incoming fluid to be measured is inducted to the turbine, a distributing-chamber receiving the fluid from the turbine for distribution through the valve to the cylinders, and registering apparatus operated by said shaft, all substantially as herein described.

In testimony whereof I have signed this specification in the presence of two subscribing witnesses.

AIMÉ BONNA.

Witnesses:
F. LA ROCHE,
EUG. DUBIN.